United States Patent [19]

Oliver et al.

[11] Patent Number: 5,694,382
[45] Date of Patent: Dec. 2, 1997

[54] BLANK SECTOR DETECTION FOR OPTICAL DISK DRIVE

[75] Inventors: Thomas C. Oliver, Fort Collins; Kraig A. Proehl, Loveland; Leo J. Embry, Fort Collins, all of Colo.

[73] Assignee: Hewlett-Packard Company, Palo Alto, Calif.

[21] Appl. No.: 692,323

[22] Filed: Aug. 5, 1996

Related U.S. Application Data

[63] Continuation of Ser. No. 222,971, Apr. 5, 1994, abandoned.

[51] Int. Cl.$^6$ ........................................ G11B 7/00
[52] U.S. Cl. ................................... 369/58; 369/54
[58] Field of Search .................... 369/54, 58, 47, 369/48, 50, 59, 116, 124, 44.32; 360/31, 48

[56] References Cited

U.S. PATENT DOCUMENTS

| | | | |
|---|---|---|---|
| 4,689,778 | 8/1987 | Miura et al. | 369/54 |
| 4,700,056 | 10/1987 | Silvy et al. | |
| 4,901,301 | 2/1990 | Senshu | 369/54 |
| 4,937,440 | 6/1990 | Hofer et al. | |
| 4,942,564 | 7/1990 | Hofer et al. | 369/58 |
| 5,060,218 | 10/1991 | Chiyomatsu | 369/54 X |
| 5,113,384 | 5/1992 | McDonald et al. | 369/44.29 |
| 5,199,011 | 3/1993 | McDonald et al. | 369/58 |

*Primary Examiner*—P. W. Huber

[57] ABSTRACT

Detecting blank sectors in an optical disk is disclosed. Such detection operates by sampling a target data field of a sector on the optical disk and generating a read peak signal based upon the sampling. The read peak signal is then compared to a predetermined amplitude threshold. A counter is incremented if the read peak signal is less than the predetermined amplitude threshold. After the above steps are performed a predetermined number of times, the counter is compared to a predetermined sample threshold value. Then, the sector is interpreted as being blank if the counter is greater than the predetermined sample threshold value. If, instead, the counter is less than the predetermined sample threshold value, then the sector is interpreted as being non-blank.

16 Claims, 9 Drawing Sheets

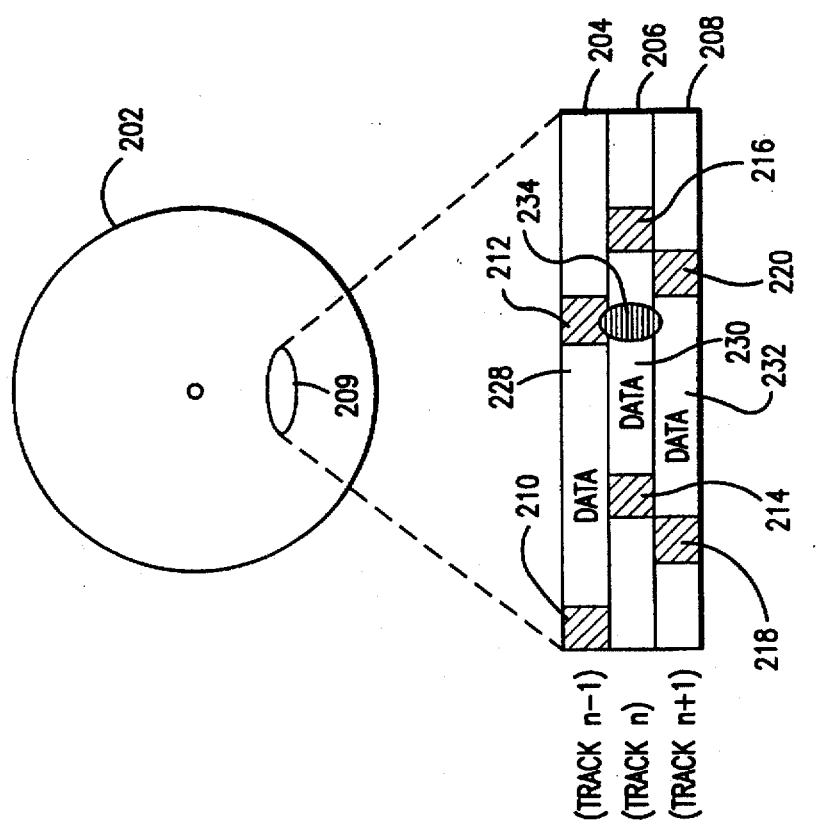
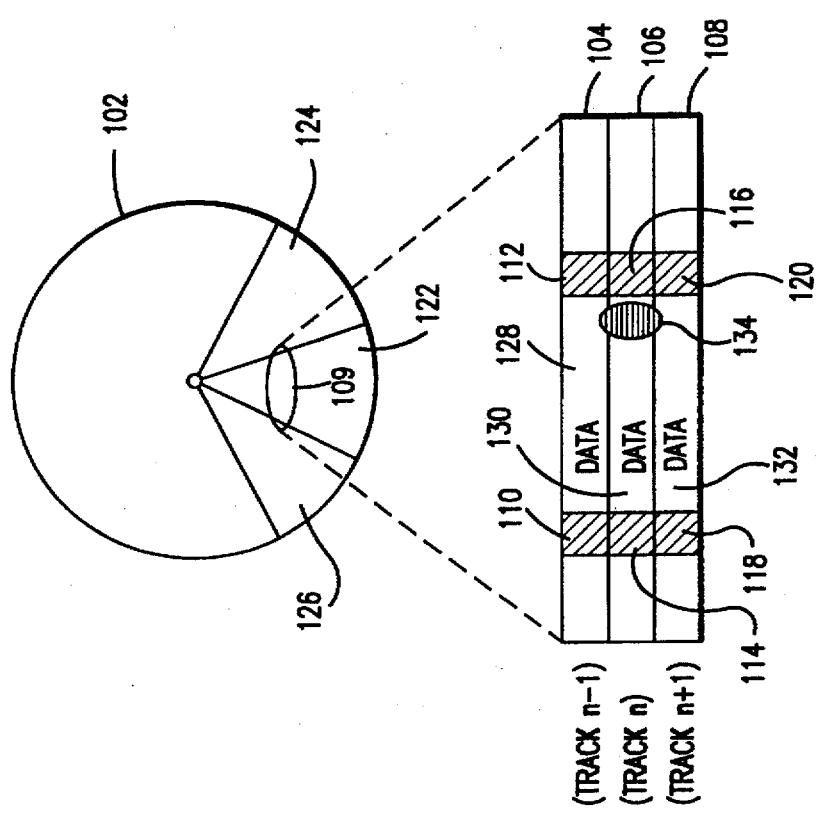

| MEDIA CHARACTERISTICS | | |
|---|---|---|
| 602 | 604 | 606 |
| CAPACITY (MB) | SECTOR SIZE (BYTES) | RECORDING METHOD |
| 650 | 1024 | R/W |
| 650 | 512 | R/W |
| 1300 | 1024 | R/W |
| 1300 | 512 | R/W |
| 650 | 1024 | WORM |
| 650 | 512 | WORM |
| 1300 | 1024 | WORM |
| 1300 | 512 | WORM |

FIG.6

| SAMPLE THRESHOLD DETERMINATION EXAMPLE 702 | 704 |
|---|---|
| MEDIA CHARACTERISTIC | VALUE/TYPE |
| CAPACITY (MB) & SPEED | HIGH DENSITY; 1300 MB 2400 RPM |
| ZONE LOCATION | ZONE 0 |
| SECTOR SIZE | 1024 BYTES |
| SECTOR TIME | 1240 μs |
| RECORDING METHOD | R/W OR WORM |

FIG.7

SAMPLES FOR EACH ZONE OF EXAMPLE MEDIA

| 802 | 804 | 806 | 808 | 810 | 812 | 814 |
|---|---|---|---|---|---|---|
| ZONE | $S_{DATA}$ | $S_H$ | $S_M$ | $S_S$ | $S_X$ | $S_{THRESH}$ |
| 0 | 60 | 6 | 4 | 2 | 9 | 39 |
| 1 | 56 | 6 | 4 | 2 | 7 | 37 |
| 2 | 53 | 6 | 4 | 2 | 6 | 35 |
| 3 | 50 | 6 | 4 | 2 | 5 | 33 |
| ... | ... | ... | ... | ... | ... | ... |
| 10 | 37 | 4 | 3 | 2 | 4 | 24 |
| . | . | . | . | . | . | . |
| 15 | 31 | 4 | 2 | 2 | 2 | 21 |

FIG. 8

| BLANK SECTOR LOOK-UP TABLE | | | | | | | | |
|---|---|---|---|---|---|---|---|---|
| 902 | 904 | 906 | 908 | 910 | 912 | 914 | 916 | 918 |
| SECTOR SIZE → | 1024 BYTES | | | | 512 BYTES | | | |
| MEDIA & SPEED → | LOW DENSITY (3600 RPM) | | HIGH DENSITY (2400 RPM) | | LOW DENSITY (3600 RPM) | | HIGH DENSITY (2400 RPM) | |
| SAMPLES → ZONE ↓ | $S_{DATA}$ | $S_{THRESH}$ | $S_{DATA}$ | $S_{THRESH}$ | $S_{DATA}$ | $S_{THRESH}$ | $S_{DATA}$ | $S_{THRESH}$ |
| 0 | 47 | 33 | 60 | 39 | 24 | 17 | 32 | 18 |
| 1 | 47 | 33 | 56 | 37 | 24 | 17 | 30 | 18 |
| 2 | 47 | 33 | 53 | 35 | 24 | 17 | 28 | 17 |
| 3 | 47 | 33 | 50 | 33 | 24 | 17 | 27 | 16 |
| 4 | 47 | 33 | 48 | 31 | 24 | 17 | 26 | 15 |
| 5 | 47 | 33 | 46 | 30 | 24 | 17 | 24 | 14 |
| 6 | 47 | 33 | 44 | 28 | 24 | 17 | 23 | 14 |
| 7 | 47 | 33 | 42 | 28 | 24 | 17 | 22 | 14 |
| 8 | 47 | 33 | 40 | 26 | 24 | 17 | 21 | 13 |
| 9 | 47 | 33 | 38 | 26 | 24 | 17 | 21 | 12 |
| 10 | 47 | 33 | 37 | 24 | 24 | 17 | 20 | 11 |
| 11 | 47 | 33 | 35 | 23 | 24 | 17 | 19 | 10 |
| 12 | 47 | 33 | 34 | 23 | 24 | 17 | 18 | 9 |
| 13 | 47 | 33 | 33 | 21 | 24 | 17 | 18 | 9 |
| 14 | 47 | 33 | 32 | 21 | 24 | 17 | 17 | 8 |
| 15 | 47 | 33 | 31 | 21 | 24 | 17 | 16 | 8 |

FIG.9

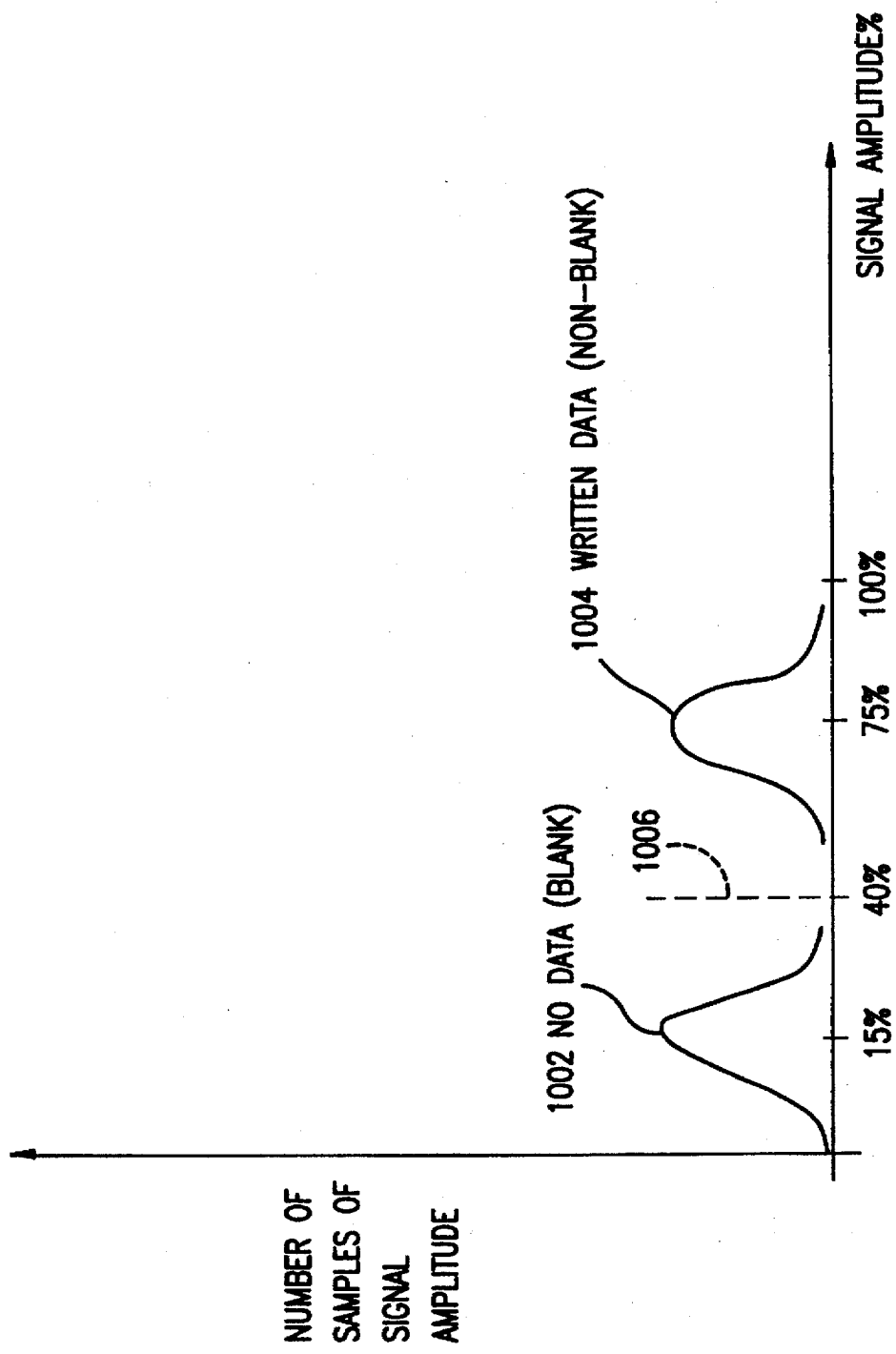

BLANK SECTOR DETECTION FOR OPTICAL DISK DRIVE

CROSS REFERENCE TO RELATED APPLICATION

This is a continuation of application Ser. No. 08/222,971 filed on Apr. 05, 1994, now abandoned.

BACKGROUND OF THE INVENTION

1. Field of the Invention

The present invention relates generally to data storage, and more particularly, to the detection of blank sectors on optical disk media for optical disk drive systems.

2. Related Art

Optical data recording technology has developed to the point where it is commonly found in many consumer electronic products. Optical video disks and optical compact audio disks have, for example, become very popular. This technology is also being adapted to high density optical data recording and storage systems. With continued advances in this technology it is believed that optical systems of this type will be able to compete in terms of performance and cost with magnetic data storage systems currently in widespread use.

Optical data recording technology combines the erasability features of magnetic data storage systems with the high data storage capacity of optical systems. For example, a 5.25 inch magneto-optic disk can typically hold 650M or 1300M bytes of information, 1000 or more times the amount of information that a similarly sized magnetic floppy diskette can store. Optical disks are also transportable; they can be easily transferred between optical disk drives. Since the reading, writing, and erasing operations are performed with light beams rather than magnetic heads, optical disks have a long life, high reliability, and are relatively immune to physical wear.

The principles of optical dam recording technology are well known to a person skilled in the relevant art. Information is digitally stored at bit positions on an optical disk. The orientation of the magnetic field at each bit position can be switched between a digital one state in which its north pole is oriented upward, and a digital zero state in which the magnetic field is reversed and the north pole oriented downward. The orientation of the magnetic field at each bit position is set to a particular value (or digital state) by subjecting the bit position to a magnetic field of the appropriate polarity, and heating the bit position of the disk. The magnetic orientation of the bit position is "frozen" when the disk cools and returns to room temperature.

The magnetic fields of all bit positions in an unwritten disk are generally oriented with north poles pointing down to represent digital zeros. When writing digital one information, the bit positions are subjected to a write magnetic bias field and heated by a high intensity laser beam. This causes the orientation of the magnetic fields at the written bit positions to reverse to north poles up. Bit positions are erased (that is, reset to a digital zero state) by subjecting them to an erase bias field of the opposite polarity, and again heating the bit position. The magnetic field orientation at the erased bit positions is reversed to north poles down.

Data is read from the optical disk using a low-power or read intensity laser beam. Because of the well known magneto-optic phenomenon known as the Kerr Effect, the polarization of a laser beam impinged upon the bit positions will be rotated as a function of the magnetic orientation of the bits. The polarization of the reflected laser beam from bit positions on the optical disk is detected by opto-electronic detector circuitry. Readback signals from the detector circuitry are then processed to determine whether the bit position is representative of a digital one or zero.

Unlike its magnetic counterpart, optical recording can support read-only (ROM), write-once, read many (WORM) and erasable/rewritable (Read/Write or R/W) modes of data storage. There are various methods that can be used to write and read data from WORM and R/W optical disks. For example, for a WORM disk, an ablative process can be used wherein a laser is used to burn holes into the media surface. More commonly, a magneto-optical (MO) approach is utilized for reading, writing, and erasing data from both, R/W and WORM media. The principles of magneto-optic technology are well known to a person skilled in the relevant art. When the magneto-optical approach is implemented with WORM media, flags are used in the sector headers to indicate whether the sectors are written rather than using the permanently destructive ablative process.

To write data to R/W and WORM media, two passes across the sector containing the target data field are required. For R/W media, the first pass of the two-pass write process erases data presently existing on the disk. The second pass then writes the new data on the disk. To determine if the sector has data, and therefore should be erased prior to writing, the optical disk drive first determines if the sector is blank.

For WORM media, the first pass of the two pass write process detects if the sector is blank. If so, then the second pass writes the new data onto the disk. Thus, blank sector detection is necessary to ensure a sector is not written to prior to the write pass. If the sector is already written to, the optical disk drive must abort the write process for that sector.

One conventional approach to determining if a sector has data is to count the number of data transitions of the readback signal within the sector. A judgement of blank versus non-blank status of the sector is then made based upon the total number of transitions which have occurred by the end of the data field. An exemplary disk drive utilizing such a conventional approach is the Corsair I optical disk drive system, manufactured by Hewlett Packard, Fort Collins, Colo., U.S.A.

In the Corsair I optical disk drive, blank sector detection is performed with a read/write channel amplifying the readback signal and differentiating the readback signal to determine the point of zero crossings. Each zero crossing of the differentiated readback signal indicates a signal peak. This is interpreted as the occurrence of data, and the read/write channel outputs a pulse indicating the transition. The number of transitions are counted by a counter which is reset at the beginning of the data field within a sector. The counter counts up with each transition as the data field is traversed. If the total number of transitions is above a certain threshold level, then the optical disk drive attributes the transitions in the data field to the presence of data, and the sector is considered non-blank.

A problem with this approach is its susceptibility to header crosstalk. This is particularly true with high density media utilizing a zoned approach to data storage. The use of multiple zones has been recently advanced to increase the capacity of optical disks. Optical disks implementing the zoned or sliding sector approach have a greater capacity since tracks which are positioned at a greater radii are not limited to the number of sectors which can be placed on smaller radii tracks. Typically, optical disks contain a constant number of radially aligned sectors. However, in the zoned approach, sectors are not radially aligned. The sectors are placed adjacent to each other, resulting in many of the zones not having radially aligned sectors. The rotational speed or the clock period is then allowed to vary from one zone to the next.

This mis-alignment of sectors results in some headers being adjacent to neighboring data fields. This alignment of headers and data fields results in what is referred to in the industry as header crosstalk. Header crosstalk, which is experienced in all types of optical disks, utilizing the zoned approach increases the error rate experienced during the decoding of the readback signal.

The effect of header crosstalk depends upon the amplitude of the readback signal. Header crosstalk generally does not adversely affect the reading of the optical disk when a sector contains written data. The data amplitude relative to the crosstalk is generally high and there is error correction embedded within the encoded data. However, header crosstalk is a problem when the data signal amplitude is low, such as in the case of a blank (erased) sector. The crosstalk superimposed upon this low amplitude read signal can be a dominant component, resulting in a readback signal composed of the many contours of the header. That is, the "blank" sector has a readback signal with many transitions.

Thus, a problem with the conventional approach for determining whether a sector has data (described above) is its susceptibility to header crosstalk and contamination. Since the counter is incremented with every transition during the entire data field, any noise, header crosstalk, or contamination causes many "qualified" transitions to occur. These transitions are then later considered to be data. In addition, noise in the read path, such as in the optics, read channel, connectors, supplies, etc., cause transitions to occur. The disk drive then attempts to read the sector and there will be no data to be decoded. The controller then thinks that the sector is both non-blank and un-readable (that is, corrupted).

What is needed, therefore, is a means for detecting blank sectors in an optical disk media which appears in an environment with high crosstalk, noise, and contamination to prevent over-write errors when using read/write and, particularly, write-once media.

SUMMARY OF THE INVENTION

The present invention is an optical disk drive system having a means for detecting blank sectors in a high crosstalk environment to prevent over-write errors when using read/write and, particularly, write-once media.

The present invention is directed to a system and method of detecting blank sectors in an optical disk. The present invention operates by sampling a target data field of a sector on the optical disk and generating a read peak signal based upon the sampling. The read peak signal is then compared to a predetermined amplitude threshold. A counter is incremented if the read peak signal is less than the predetermined amplitude threshold. After the above steps are performed a predetermined number of times, the counter is compared to a predetermined sample threshold value. Then, the sector is interpreted as being blank if the counter is greater than the predetermined sample threshold value. If, instead, the counter is less than the predetermined sample threshold value, then the sector is interpreted as being non-blank.

One advantage of the present invention is the elimination of header crosstalk sensitivity as a result of continually sampling data throughout the sector. An amplitude qualification eliminates low amplitude noise.

Another advantage of the present invention is the utilization of a digital signal processor to provide flexibility to address different media types.

Another advantage of the present invention is that it considers the type or capacity of the media, the sector size, etc. Thus, this approach provides flexibility to adequately respond to different media characteristic combinations.

BRIEF DESCRIPTION OF THE FIGURES

The invention is best understood by reference to the Figures wherein references with like reference numbers indicate identical or functionally similar elements. In addition, the left-most digits refer to the figure in which the reference first appears in the accompanying drawings in which:

FIG. 1 is a schematic diagram of an optical disk which stores data according to tracks and sectors;

FIG. 2 is a schematic diagram of an optical disk which stores data utilizing zones;

FIG. 6 is a table describing High Density Media Characteristics;

FIG. 7 is a Blank Check Look-Up Table;

FIG. 8 is a table showing example sample data;

FIG. 9 is a blank sector look-up table; and

FIG. 10 is a plot of signal amplitude versus number of samples.

DETAILED DESCRIPTION OF THE EMBODIMENTS

I. Header Crosstalk

Figure 3:
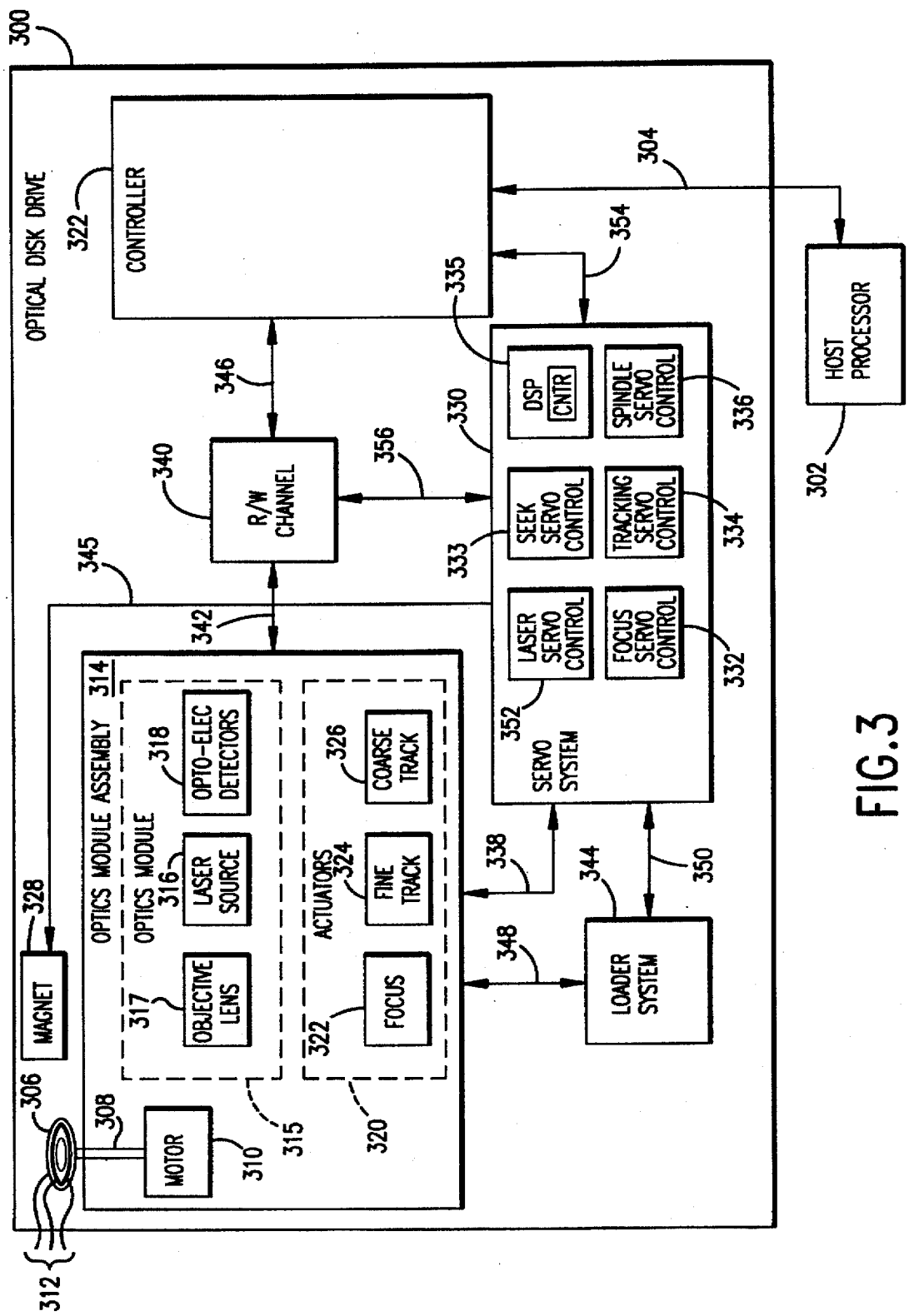
FIG. 3 is an block diagram of an optical disk drive system in accordance with the preferred embodiment of the present invention.

The problems of header crosstalk, particularly in high density optical disks, is now discussed. First, the methods of storing data on high and low density optical disks is described. Then, header crosstalk and the contribution of the zoned approach of storing data to header crosstalk is explained.

A. Optical Disk Data

FIG. 1 illustrates an optical disk 102 which stores data according to tracks and sectors. Optical disk 102 includes of a number of sectors 122, 124, and 126, and a number of tracks 104, 106, and 108 along which information is recorded. As shown by the magnified view 109 of optical disk 102, headers 110, 112, 114, 116, 118, and 120 are impressed and positioned in a periodic fashion in tracks 104, 106, and 108 to divide optical disk 102 into sectors 122, 124, and 126. Each header 110, 112, 114, 116, 118, and 120 contains unique positional information such as track and sector information, which is read by the optical disk drive to determine where a laser (not shown) is positioned on disk 102.

Data is stored along tracks within sectors. For example, within sector 122, data field 128 is stored between headers 110 and 112 on track 104; data filed 130 is stored between headers 114 and 116 on track 106; and data field 132 is stored between headers 118 and 120 on track 108. Tracks are counted according to their radial position on optical disk 102. Thus, if track 106 is track (n), then track 104 is (n−1) and track 108 is (n+1). In optical disk 102, there are a constant number of radially aligned sectors 122, 124, and 126, each containing a constant number of concentrically positioned tracks 104, 106, and 108. As shown in FIG. 1, each track contains the same quantity of data, irrespective of its radial position on optical disk 102.

One scheme to increase the capacity of optical disks is the use of multiple zones, also referred to as sliding sectors. FIG. 2 illustrates an optical disk 202 wherein multiple zones are implemented to store data. Optical disk 202 does not contain fixed sectors with aligned headers and data fields. Rather, the data fields are simply positioned adjacent to each other without regard to sector alignment. For example, as shown in the magnified view 209 of optical disk 202, in track 204, between headers 210 and 212 is data field 228. In adjacent track 206, data field 230 lies between headers 214 and 216. Adjacent to that track, data field 232 lies between headers 218 and 220. In a preferred embodiment of the present invention, tracks 204, 206, and 208 are actually a single, spirally-positioned track. This zoning scheme enables tracks with larger radii to store more data than tracks with smaller radii. Thus, track (n) 206 stores more data than track (n−1) 204. As a result, the zoned approach enables optical disk 202 to have a larger capacity than optical disk 102.

However, many of the zones do not have radially aligned headers when utilizing the zoned approach. For example, referring to FIG. 1, headers 110, 114, and 118 are radially aligned with each other to form one boundary of sector 122. Likewise, headers 112, 116, and 120 are radially aligned with each other to form the other boundary of sector 122. Referring to the zoned approach of FIG. 2, the headers are not aligned with each other. This mis-alignment of headers results in some sectors being adjacent to neighboring data fields. For example, adjacent to data field 230 of track n 206 is header 212 of track (n−1) 204 and header 220 of track (n+1) 208. If data field 230 is to be read, then the sector containing data field 230 is referred to as the target sector and the associated header, header 214 is referred to as the target sector header. Also, headers which are aligned with (that is, adjacent to) the target sector data field 230 are referred to as inner and outer headers. Thus, relative to data field 230, header 212 is an inner header and header 220 is an outer header.

B. Header Crosstalk

Headers are molded into the substrate of the optical disk media, producing hundreds of small contour transitions. When a header is being read by a laser, the contours constructively or destructively reflect the laser light back to the optical detector. However, when data is being read in a sector which is adjacent to the header, the header contours distort the data's readback signal. This is shown with reference to FIGS. 1 and 2, wherein the incidence of a laser beam 134 and 234 are shown over data fields 130 and 230, respectively. Because the readback beam of laser beam 134, 234 extends slightly beyond the target sector's width, interference from the adjacent tracks is possible. When the track adjacent to the target data field is also a data field, the interference is minimal. However, when the track adjacent to the target data field is a header, the interference may not be minimal. The contours in the adjacent header are picked up by the laser and interfere with the readback signal of the target data field. This is because the readback beam of the laser beam 134, 234 extends slightly beyond the target sector's width and because the header contours can be positioned slightly off center from their own track. Thus, the presence of inner header 212 and outer header 220 near the target sector's data field 230 produce a phenomenon called header crosstalk.

Header crosstalk is typically not a problem when a sector contains written data. The data amplitude relative to the crosstalk is generally higher and there is error correction embedded into the encoding of the data. Header crosstalk is a problem when the data signal amplitude is low, such as in the case of a blank sector. In a blank (erased) sector, the signal amplitude is very low. The crosstalk superimposed upon this low level signal can be a dominant component. The resulting signal is composed of the many contours of the header (has many transitions). The transitions are amplified and differentiated by the read channel and then counted in the controller. If crosstalk is very large, there will be many "qualified" transitions and the sector will be mistakenly interpreted as being non-blank. But, when the drive tries to read the sector, data will not be decoder. The controller interprets this condition as a sector which is both non-blank and un-readable (that is, corrupted).

The alignment of headers and data fields, (that is, having headers adjacent to data fields) results in header crosstalk. Header crosstalk is a common problem in the industry, particularly with high density media utilizing the zoned approach discussed above. Header crosstalk deteriorates the readback signal. This has had adverse effects on the error rate experienced in decoding the readback signal. It also negatively impacts the accuracy of the blank section detection process.

II. System Architecture and General Operation

Referring to FIG. 3, optical disk drive 300 is adapted to receive and perform operations on optical disk 306. Optical disk 306 is positioned on a spindle 308 and rotated by a motor 310. Binary data is located in the optical disk 306 at discrete bit positions (not shown) aligned adjacent to each other along elongated servo track 312 which is disposed on the surface of disk 306. In the preferred embodiment of the present invention, optical disk 306 includes a single servo track 312 which is spirally positioned on the optical disk 306. However, as one skilled in the relevant art would find apparent, the present invention may be implemented in optical disk drive systems configured to operate on optical disks having a plurality of concentrically positioned servo tracks.

The optical disk 306 includes of a number of tracks along which information is recorded. The location of the information is identified by track and sector designation relating to a coordinate system for locating data. Headers are impressed and are positioned in a periodic fashion to divide optical disk 306 into sectors. Each header contains unique positional information (track, sector, etc.) which optical disk drive 300 reads to determine where a laser is positioned on disk 306. Data is stored along the servo track 312, between the sectors. The headers and spiral can never be altered and are read back using constructive and destructive interference principals. The cartridge shape and disk characteristics conform to current and potential future industry standards (for example, ISO & ANSI standards for optical disks).

Different classifications have been established for optical disk media. The more common media classifications are Read Only Memory (ROM), Write Once, Read Many (WORM), and Read/Write (R/W). A distinguishing feature among classifications is the ability or inability to repeatedly write data to the media. ROM media may never be written to after manufacture and may be read an infinite number of times. ROM optical disk media are typically used in music (compact disks) and bulk data applications. Data can be written to WORM optical media only a single time and can be read an infinite number of times. WORM optical media is typically used in archival applications. R/W optical media can be written to and read from an infinite number of times. Thus, in contrast to ROM and WORM optical media, R/W media may be used in any application.

There are various methods that can be used to write and read data from WORM and R/W optical disks. For example, for a WORM disk, an ablative process can be used wherein a laser is used to burn holes into the media surface. Another process, referred to as the phase change process, utilizes a laser to melt the media surface. In the preferred embodiment of the present invention, a magneto-optical (MO) approach is utilized for reading, writing, and erasing data from both, R/W and WORM media.

Magneto-optic data recording technology combines the erasability features of magnetic data storage systems with the high data storage capacity of optical systems. Magneto-optic disks are also transportable; they can be easily transferred between optical disk drives. Since the reading, writing, and erasing operations are performed with a laser beam rather than magnetic heads, magneto-optic disk 306 has a longer life, higher reliability, and is relatively immune to physical wear. The principles of magneto-optic technology are well known to a person skilled in the relevant art.

The magnetic fields of all bit positions in an unwritten optical disk will generally be oriented with north poles pointing down to represent digital zeros. When writing digital one information, the bit positions will be subjected to a write magnetic bias field from bias magnet 328 and heated by a high intensity laser beam generated by laser source 316. The orientation of the magnetic fields at the written bit positions will reverse to north poles up. Bit positions are erased (or reset to a logical "0" value) by subjecting them to an erase bias field of the opposite polarity, and again heating the bit position field orientation at the erased bit positions will then reverse and switch to north poles down.

Data is read from magneto-optic disk 306 using a low-power or read intensity laser beam (not shown). The reflection characteristics of the optical disk 306 depend upon the local magnetic domain state. Because of the well known magneto-optic phenomenon known as the Kerr Effect, the polarization of a laser beam impinged upon the bit positions will be rotated as a function of the magnetic orientation of the bits. The changes in the reflected polarity of the incident radiation returning from the surface of the optical disk enables opto-electronic detector circuitry located in an optical module assembly 314 to reflect the orientation of the magnetic dipole in each local region of the disk 306.

Opto-electronic detector circuitry 318 in an optics module 315 of the optical module assembly 314 measures selected phase characteristics of the polarized light reflected by the region. Thus, each local region of the disk 306 can represent one piece of binary data with the orientation of the magnetic dipole being associated with the data value. In optical disk drive system 300, the information is optically detected by orienting a read/write head over the center of the track 312 while disk 306 spins underneath the head. The read/write head carries a laser source 316, an objective lens 317 for focusing the laser beam, and optical detectors 318 for developing positioning signals for the objective lens 317. In the preferred embodiment of the present invention, laser source 316, opto-electronic detector circuitry 318, and objective lens 317 are packaged in a single optics module 315.

Actuators 320 include three types of actuators used to position the laser on the surface of the disk 306. They are focus actuator 322, for focusing the laser to a point on disk 306; fine tracking actuator 324, for positioning the focused laser beam 340 within a spiral groove on the disk; and coarse tracking actuator 326, for positioning both the above-mentioned actuators at a radial position on optical disk 306.

Spindle motor 310 is used to accelerate and decelerate optical disk 306 and maintain constant rotational speed. Under control of loader system 344, the top of motor 310 accepts the disk's metal hub and clamps the disk on to the spindle 308 through magnetic attraction. Optics module 315, actuators 320, and spindle motor 310 are included in optics module assembly 314.

Bias magnet 328 is an assembly which contains a cylindrical magnet which rotates along its long axis. Bias magnet 328 is magnetized such that the one side of its long axis is North and the other is South (2 poles). Bias magnet 328 is positioned near the surface of optical disk 306 and is rotated to provide the appropriate bias field for writing data to optical disk 306.

Optical disk drive 300 includes a servo system 330 that comprises a focus servo system 332 for driving objective lens 317 about a focus axis to keep the laser beam properly focused on disk 306. A tracking servo system 334 in the servo system 330 is also used to drive objective lens 317 along a tracking axis perpendicular to servo tracks 312, and to maintain the laser beam centered over a desired servo track. Tracking and focus servo systems 334, 332 for optical disk drives are well known to persons skilled in the relevant art. For example, common tracking and focus servo systems for optical disk drives are described in commonly owned U.S. Pat. No. 4,700,056 to Silvy et al., herein incorporated by reference in its entirety.

The laser source 316 is used to perform read, write, and erase operations. Distinct power levels exist for each of these operations. Close maintenance of the focal point at the optical disk surface is necessary to bring sufficient energy to a local region. This is particularly true for write and erase operations. Because the surface of optical disk 306 is not perfectly flat, the focal point must be constantly moved to maintain focus of the beam at the surface of the disk. Movement of the focal point is achieved by controlling the movement of objective lens 317.

Electro-optical detectors 318 includes an array of optical sensors which produce output signals in response to the laser light reflected by the surface of optical disk 306. The radial distribution of energy around the central axis of the laser beam is functionally related to the output signals from the sensors. The output signals can thus be related to the focus and tracking position.

Controller 322 contains a microprocessor system, data buffering components, data error detection electronics and encode/decode electronics which enable controller 322 to transform commands received from host processor 302 into lower level drive operations, such as seek, read, write, erase, and verify operations. Controller 322 interfaces with host processor 302 via a SCSI interface 304. The main functions of controller 322 are the coordination of the operation of a servo system 330 and read/write channel 340.

Servo system 330 includes electronics and firmware to perform all functions related to the control of optics module assembly 314, bias magnet 328, R/W channel 340, and loader system 344. Servo system 330 includes a laser servo control system 352 for controlling laser source 316; a focus servo control system 332 for controlling focus actuator 322;

a tracking servo control system 334 for controlling fine tracking actuator 324 and coarse tracking actuator 326; a seek servo control system 333 for controlling fine and coarse tracking actuators 324 and 326 to achieve large movements in laser travel; and a spindle servo control system 336 for controlling spindle motor 310. Of these, the primary function of servo system 330 is the accurate focusing and tracking of the laser beam within a servo track 312 on the surface of optical disk 306. Laser servo control system 352, focus servo control system 332, tracking servo control system 334, spindle servo control system 336, and seek servo control system 333 operate under the control of a digital signal processor (DSP) 335. Digital signal processor 335 can be programmed to perform operations in response to commands received from controller 322 via control line 354.

Read/Write (R/W) channel 340 provides an interface with the opto-electrical detectors 318 and laser 316 of optical module assembly 314. When data is being written to optical disk 306, R/W channel 340 essentially controls the on/off operation of laser source 316. When data is read from optical disk 306, R/W channel 340 amplifies the read signals coming from optical detectors 318 in the optics module assembly 314 via signal line 342. R/W channel 340 then conditions the read signals to filter out noise and determines the time between peak signal amplitudes. R/W channel 340 is controlled by digital signal processor 335. Digital signal processor 335 has access to read/write signals and digitizes the readback signals. Digital signal processor 335 controls R/W channel 340 via communication means 356. Digital signal processor 335 has a counter 337 which is used in the implementation of the present invention (discussed below).

During read operations, controller 322 decodes the data which is read from optical disk 306 and performs error correction operations to verify the integrity of the data. Controller 322 then transfers the data to host processor 302. During write operations, controller 322 encodes data received from host processor 302 via SCSI interface 304 and supervises the write process. Controller 322 also controls the operation of the present invention (discussed below).

III. Blank Sector Detection

The blank sector detection system and method of the present invention is now described. First, the blank sector detection process which is performed by the optical disk drive system 300 introduced above is described. This process is controlled by controller 322, however, the majority of processing functions are performed by digital signal processor 335. After the blank sector detection process is explained, the determination of the sample threshold and amplitude threshold are described. Finally, the calibrations associated with maintaining efficient blank sector detection is described.

A. Blank Sector Detection Process

Figure 4:
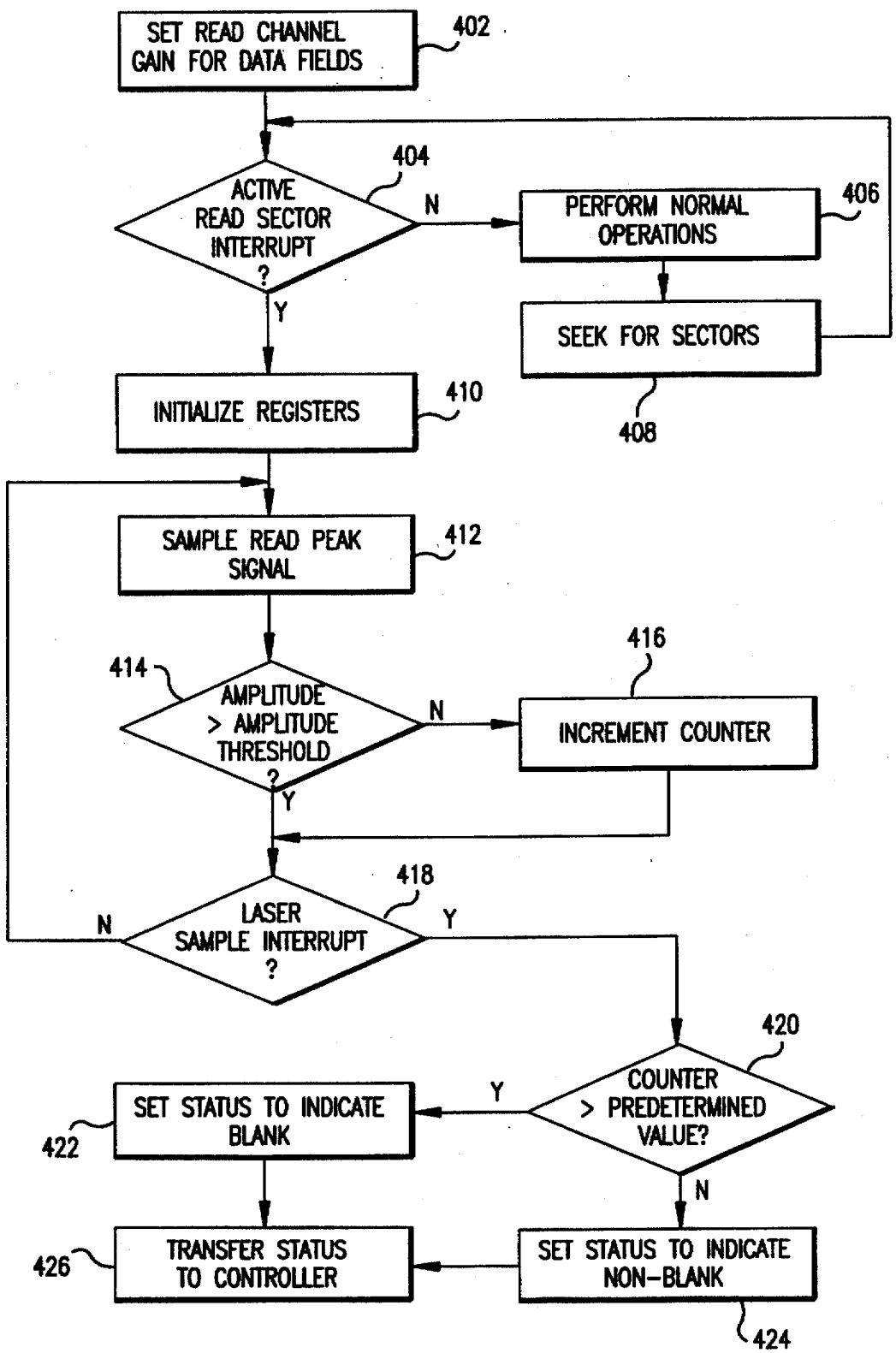
FIG. 4 is a flowchart of the preferred embodiment of the blank sector detection method of the present invention.

FIG. 4 is a flow chart of the blank sector detection process of the preferred embodiment of the present invention. Referring to FIG. 4, the steps of the blank sector detection process are primarily performed by digital signal processor 335, R/W channel 340, and controller 322.

In step 402, controller 322 sends a command to digital signal processor 335, via communication medium 354, to set the read channel gain. Digital signal processor 335 then sends a command to the Read/Write channel 340 via communication medium 356 to set the gain of the read channel in preparation for the reading back of dam. Read/write channel 340 enters an automatic gain control mode upon receiving the gain control command from digital signal processor 335, wherein all readback signals received from optics module assembly 314 via communication medium 342 are amplified at the selected readback signal gain. At the completion of step 402, digital signal processor 335 enters the blank sector mode of operation.

In step 404, digital signal processor 335 enters into a wait mode for a specific interrupt from controller 322. This interrupt, referred to as the active read sector interrupt, is sent by controller 322. Controller 322 issues the active read sector interrupt when a data field in the disk 306 for which blank checking is to be performed is about to be read (as part of the blank checking operation). In the preferred embodiment, this data field is referred to as the target data field and the active read sector interrupt is designated as $I_{Begin}$.

If the active read sector interrupt does not occur, digital signal processor 335 continues to wait by performing normal operations in step 406. These normal operations continue until the active read sector interrupt is issued by controller 322. These normal operations include such operations as focus, tracking, etc.

As part of the waiting process, in step 408, controller 322 issues a seek command to digital signal processor 335 to seek for sector(s) to be blank checked. In response to the seek command from the controller 322, digital signal processor 335 performs the seek function utilizing seek servo control system 333 and fine and coarse tracking actuators 324 and 326. The digital signal processor 335 requires location information identifying the location of the laser relative to the disk as a result of the seek function. The digital signal processor 335 sends the location information to controller 322. Controller 322 determines which sectors (identified by the location information) are to be verified based on certain criteria. For example, if during an erase operation an error is encountered, controller 322 may perform blank sector detection operations on the sectors which have been erased to verify that they have been properly erased. Also, controller 322 may receive a command from host processor 302, indicating which sectors are to be blank checked.

Controller 322 continues to read the headers received from R/W channel 340, looking for the desired sectors. Once a target sector is encountered, controller 322 issues the active read sector interrupt to the servo system digital signal processor 335 via communications medium 354. This is shown in FIG. 4 as the processing flow passing from decision block 404 to step 410, indicating that an active read sector interrupt has been issued by controller 322.

Figure 5:
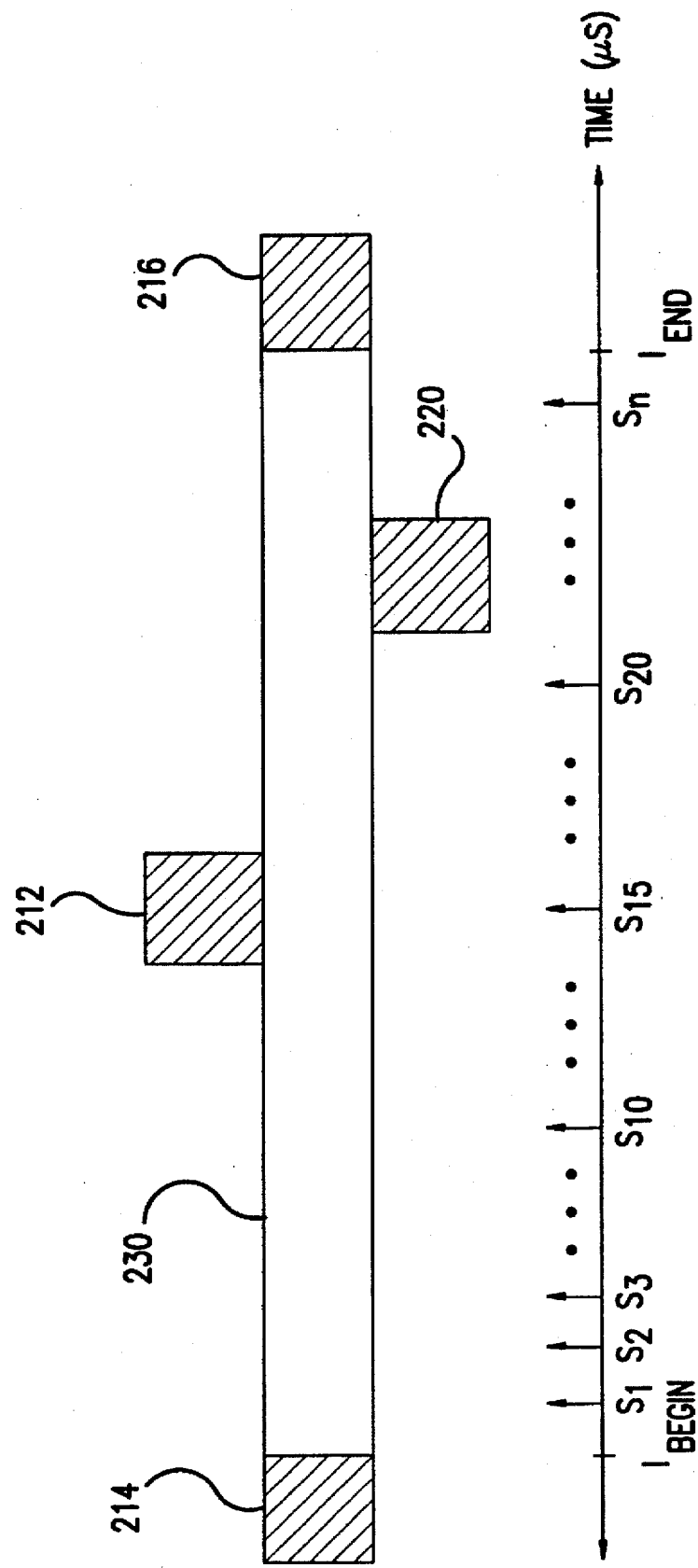
FIG. 5 is a single sector of a high density media optical disk utilizing the zoned approach to stored data.

FIG. 5 illustrates target sector 500 of the disk 306 which includes target sector header 214 and data field 230. Active read sector interrupt $I_{begin}$ occurs as the laser beam infringes on the end of target sector header 214, just prior to target data field 230. As discussed above with reference to step 402, digital signal processor 335 has previously entered blank sector detection mode. Once the active read sector interrupt is issued by controller 322 and received by digital signal processor 335, digital signal processor 335 initializes counters 337, which are used during the blank sector detection process, in step 410.

Referring again to FIG. 5, as the laser beam travels the length of target data field 230, in step 412 digital signal processor 335 samples read peak signals received from read/write channel 340 via communication medium 356. The sampled read peak signals are the average of the amplitude of the readback signals. This read peak signal is therefore proportional to the amplitude of the readback signal.

In step 414, digital signal processor 335 determines if the amplitude of the average read peak signal is above or below a fixed value threshold, referred to as the amplitude threshold. If the amplitude of the averaged read peak signal is below the amplitude threshold, digital signal processor 335 in step 416 increments a counter 337. The counter 337 representing the number of samples in target data field 230 which are below the amplitude threshold. This in turn indicates the number of sampled data positions which do not contain data.

If the amplitude of the averaged read peak signal is greater than the amplitude threshold, then digital signal processor 335 in step 418 checks to determine if the controller 322 has issued a laser sample interrupt. Controller 322 issues a laser sample interrupt when the end of target data field 230 is reached by the laser. This is illustrated in FIG. 5 as $I_{end}$. If laser sample interrupt $I_{end}$ is not issued by controller 322, then digital signal processor 335 returns to step 412 to continue to sample target data field 230.

Referring to FIG. 5, in the preferred embodiment of the present invention, the above samples and determinations are repeated approximately every 20 microseconds (μs). Thus, in FIG. 5, samples $S_1$ to $S_n$ occur at 20 μs increments. After the counter 337 is incremented in step 416, in step 418, digital signal processor 335 checks to determine if the controller 335 has issued a laser sample interrupt as described above.

When the end of target data field 230 is encountered and controller 322 issues laser sample interrupt $I_{end}$ as determined by the digital signal processor 335 in step 418, digital signal processor 335 stops digitizing and sampling the read peak signal. Specifically, in step 420, digital signal processor 335 makes this determination by first comparing the number of read peak samples which were below the fixed threshold as indicated by the counter 337 against a predetermined number, referred to as the sample threshold. The sample threshold is the minimum number of samples which must indicate no data for the sector to be considered blank.

If in step 420 the number of read peak samples which are below the amplitude threshold is greater than the sample threshold, then in step 422 digital signal processor 335 sets the status for target sector 500 as containing no data, that is, it is interpreted as being blank. If the number of read peak samples which are lower the amplitude threshold is less than the sample threshold, then in step 424 digital signal processor 335 sets the status for target sector 500 as containing data, that is, it is interpreted as being non-blank. This status is transferred to controller 322 by digital signal processor 335 in step 426. This transfer of status occurs at the end of every target sector 500 as traversed by the laser.

B. Sample Threshold Determination

In the blank sector detection system and method of the present invention, there are two threshold values which are determined. One is the amplitude threshold, against which the sampled read peak signal is compared to determine if a particular sampled bit position contains data (step 414). The other threshold value, referred to as the sample threshold, represents the minimum number of sampled bit positions which must contain no data for the sector to be considered blank (420). The determination of the sample threshold is discussed below. The determination of the amplitude threshold is discussed in the next section.

In determining the sample threshold, the media type, capacity, sector size, and other media characteristics are taken into consideration. This provides flexibility in the sampled threshold value to respond to different media characteristic combinations. As a result, the sample threshold must be calculated for each optical disk 306 which is placed in optical disk drive 300.

FIG. 6 is a table illustrating the media characteristics which are considered in the preferred embodiment of the present invention. Referring to FIG. 6, column 602 provides the capacity or media density. For example, the media may be high density (1300 MB) or low density (650 MB). Column 604 provides the possible sector size in bytes which are considered. In the preferred embodiment of the present invention, the sector size may be 1024 bytes or 512 bytes. Referring to column 606, the recording method or media type is provided. The media may be either of the re-writable (R/W) or write once/read many (WORM) type. Thus, there are eight combinations of capacity, sector size, and recording method which are considered in the preferred embodiment of the present invention. However, as one skilled in the relevant art would find apparent, the blank sector detection system and methods may be implemented to consider other media characteristics now or later developed.

As discussed above, in step 412, the digital signal processor 335 samples the read peak signal at a number of physical locations along target sector data field 230. Because the samples are taken along the complete length of data field 230, digital signal processor 335 has a number of samples from the target data field 230 with which to determine if the target sector 500 containing the target data field 230 is blank. This was illustrated in FIG. 5, wherein samples $S_1$ to $S_n$ are shown. The total number of samples taken for a given data field, referred to as $S_{Data}$, is a function of the zone in which the sector is located. That is, the total number of samples which are taken from a target data field depends upon the zone number. As will be discussed in detail below, this dependency upon zone number applies only to high-density media.

The preferred embodiment of the blank sector detection system and method of the present invention allows for the corruption of the read peak signal in determining the sample threshold. That is, every sample of the read peak signal is not required to be below the amplitude threshold for the sector to be considered blank. Some read peak samples may be above the amplitude threshold without adversely affecting the blank sector detection results. This flexibility enables the present invention to accurately determine the blank/non-blank status of a sector in an environment which adversely affects the read peak signal.

Corruption of the read peak signal can occur as a result of a number of factors. As discussed above, header crosstalk is particularly experienced in high-density media utilizing the zoned approach for data storage. As discussed above, in the zoned approach, the sector headers are adjacent to neighboring data fields which causes header crosstalk. Another factor which contributes to the corruption of the read peak signal is media defects. Media defects occur as a result of substrate defects and film contaminants during the deposition process. Another factor which contributes to the corruption of the read peak signal is errors in the sampling of the target data field 230. A fourth factor which contributes to the corruption of the read peak signal is the presence of adverse conditions in the optical disk drive system, referred to generally as system conditions. System conditions can include component failures, excessive system processing load, noise in the read path, and other conditions which may cause read peak signal transitions to occur.

The blank sector detection system and method of the present invention allocates a number of samples for each of the above sources of corruption. These allocated samples compensate for the imperfections discussed in the previous paragraph. The total allowance, $S_{Allow}$, is expressed as the sum of these allowances, as shown below in Equation (1).

$$S_{Allow} = S_H + S_M + S_S + S_X \tag{1}$$

where, $S_H$=Header Allowance
$S_M$=Defect Allowance
$S_S$=Sampling Error Allowance
$S_X$=Margin Allowance Essentially, $S_{Allow}$ represents the number of samples which have been corrupted and which, therefore, are incorrectly interpreted as being non-blank. Each of these sample allowances is discussed below.

Since the determination of the sample threshold for each of the zones on the optical disk is based upon the speed (RPM) and zone (zone number), the sample threshold determination will be discussed with reference to a specific example. The example sample threshold determination is discussed with respect to a 1024 byte sector located at Zone 0 on a high-density media disk rotating at 2400 RPM. These characteristics are shown in FIG. 7. Note that according to the preferred embodiment the recording method does not affect the determination of the sample threshold.

Referring to FIG. 7, the sector time for this example is 1240 μsec. That is, the time that the laser traverses the above sector is 1240 μsec. This value is given as part of the example specifications because it is based upon the location of the target sector (zone number) and the media speed (rotational speed), and is considered to be well known to a person skilled in the relevant art.

Referring to FIG. 5, if target sector 500 is a 1024 byte sector per the above example specifications, then sector header 214 contains 52 bytes and sector data field 230 contains 1308 bytes, for a total of 1360 bytes. Of the 1308 bytes in data field 230, 1024 bytes are dedicated to data and the remaining bytes are dedicated to error correction information.

The resulting time-per-byte (time the laser takes to traverse a byte), time-per-header (time the laser takes to traverse the header), and time-per-data field (time the laser takes to traverse the data field) are calculated as shown below.

$$\text{Time}_{Sector} = 1240 \text{ μs} \tag{2}$$

$$\text{Time}_{byte} = \frac{1240 \text{ μs}}{1360 \text{ bytes per sector}} = 0.91176 \text{ μs}$$

$$\text{Time}_{header} = 52 \text{ bytes per header (Time}_{byte}) = 47.4 \text{ μs}$$

$$\text{Time}_{data\ field} = 1308 \text{ bytes per data field (Time}_{byte}) = 1192.5 \text{ μs}$$

where, $\text{Time}_{byte}$=time to traverse a single byte
$\text{Time}_{header}$=time to traverse target sector header
$\text{Time}_{data\ field}$=time to traverse target data field Given the above time information, the total number of samples which are taken of the target data field 230 is calculated as shown below in Equation (3).

$$S_{Data} = \frac{\text{Time}_{data\ field}}{20 \text{ μs/sample}} = \frac{1192.5 \text{ μs}}{20 \text{ μs}} \cong 60 \text{ samples} \tag{3}$$

That is, a total of 60 samples are taken of target data field 230 located in Zone 0 of high density media rotating at 2400 RPM.

Each of the sample allowances introduced above will now be described with reference to the above example.

First, the header allowance, $S_H$, is the number of samples which may be corrupted by noise due to an adjacent track header. Referring to FIG. 5, adjacent track header 212 and adjacent track header 220 will corrupt the data samples of target data field 230. The number of samples which are affected by adjacent track headers is calculated as shown below in Equation (4).

$$S_H = \frac{\text{Time}_{header}}{20 \text{ μs/sample}} = \frac{47.4 \text{ μs}}{20 \text{ μs}} \cong 3 \text{ samples} \tag{4}$$

In other words, a maximum of 3 samples of target data field 230 will be corrupted for each of the adjacent track headers 212 and 220. In the above example, wherein the sector size is 1024 bytes located at Zone 0, there are two track headers which are adjacent to the target data field 230. Thus, a total of 6 samples may be corrupted due to adjacent track headers. Thus, $S_H$ in the above example is equal to 6 samples.

The defect allowance, $S_M$, represents the number of allowable samples which may be corrupted due to media defects. In the above example, data field 230 contains 1308 bytes. As introduced above, 1024 bytes are allocated for data, and 284 bytes are allocated for error correction information. In the preferred embodiment of the present invention, this error correction information is capable of correcting up to 80 bytes of corrupted data located at a single location in target data field 230. Assuming the maximum defect size of 80 bytes, the defect allowance in the above example is given below in Equation (5).

$$S_M = \text{Defect Bytes}\left(\frac{\text{Time}_{byte}}{20 \text{ μs/sample}}\right) = 80 \text{ bytes}\left(\frac{0.91176 \text{ μs/byte}}{20 \text{ μs}}\right) \tag{5}$$

$$= \frac{73 \text{ μs}}{20 \text{ μs}} \cong 4$$

Thus, in the preferred embodiment of the present invention, 4 samples of target data field 230 are allowed to be corrupted due to media defects within the 1024 byte sector located at zone 0 on a high-density media optical disk rotating at 2400 RPM.

The sampling error allowance, $S_S$, is the number of samples which may be corrupted due to the improper timing of the sampling of target data field 230. Referring to FIG. 5, $I_{Begin}$ occurs at the end of target sector header 214, immediately before target data field 230. Likewise, $I_{End}$ occurs at the end of target data field 230 right before sector header 216. It is possible to miss the first and last samples within data field 230 due to a "race" condition between the samples and the controller interrupts $I_{Begin}$ and $I_{End}$. Since there are always two interrupts per target data field 230 (one on each end), $S_S$ is a constant, as shown below in Equation (6).

$$S_S = 2 \text{ samples=constant} \tag{6}$$

Thus, the present invention allows for two missed samples of target data field 230 in the above example.

The margin allowance, $S_X$, represents the number of samples which may be corrupted due to system conditions. This allowance for margin in the system is needed to compensate for (1) other components which may cause fewer and (2) erroneous samples to be taken. For example, digital signal processor 335 may not sample target data field 230 every time at exactly 20 μs. These speed variations may be due to defects in the system clock or other system flaws. Another example wherein fewer samples are taken is when digital signal processor 335 "misses" a sample because it is busy with another task. In other words, digital signal processor 335 may be subject to heavy processing loads during the blank sector detection process. A third example wherein fewer samples may be taken of target data field 230, is when there are speed variations in motor 310 causing the 20 μs samples to occur at inconsistent points along target data field 230.

An example of when an erroneous sample is taken is when the media defects are distributed within data field 230. As described above with reference to the defect allowance $S_M$, media defects are assumed to occur in a single location in the target data field 230. This may be due, for example, to a scratch on the surface of the optical disk. However, media defects may be distributed along the length of data field 230, or multiple unrelated defects may occur in target data field 230. Such conditions are accounted for in the margin allowance $S_X$.

The margin allowance $S_X$ directly affects the overall blank sector check method and should be kept to a minimum, if possible. In the preferred embodiment of the present invention, margin allowance $S_X$ is based upon empirical data and decided for each zone of the high density media optical disk. This empirical data was obtained from sampling a number of optical disks from a multitude of vendors. Preferably $S_X$ is set equal to 9, although other values could be used.

Thus, for the example given above, $S_{Allow}$ is calculated as shown below in Equation (7).

$$S_{Allow} = S_H + S_M + S_S + S_X \quad (7)$$
$$= 6 + 4 + 2 + 9 = 21$$

Thus, the sample threshold for the above example is given below in Equation (8).

$$S_{Thresh} = S_{Data} - S_{Allow} \quad (8)$$
$$= 60 - 21 = 39$$

where, $S_{Thresh}$=Sample Threshold
$S_{Data}$=Total Number of Samples of Data Field
$S_{Allow}$=Sample Allowance Therefore, the sample threshold for the above example is equal to 39 samples. That is, a minimum of 39 of the 60 samples must be blank for the target sector to be considered blank. Thus, in a blank sector where 60 samples ($S_{Data}$) are taken, all 60 samples ideally should be interpreted as containing no data (in step 414). However, real world imperfections cause some samples of a blank sector to be corrupted and thus interpreted in step 414 as containing data. $S_{Allow}$ compensates for these imperfections such that a sector is considered to be blank as long as the number of samples of the sector data field which are interpreted as being blank is greater than $S_{Data}-S_{Allow}$, as shown in Equation (8) (step 414).

FIG. 8 illustrates the results of applying the above analysis to each of the zones in the 1024 byte sector example given above. Referring to FIG. 8, the high density media optical disk 306 of the above example is comprised of 16 zones as shown in column 802 of FIG. 8. The zone numbers range from zone 0, which has the smallest radial distance, to zone 15, which has the greatest radial distance. The total number of samples of each data field in the 1024 byte sector, $S_{Data}$, for each of the above zones is provided in column 804. $S_{Data}$ varies from 60 samples per data field at zone 0 to 31 samples per data field at zone 15.

The four elements of $S_{Allowance}$, as described above are provided in columns 806, 808, 810, and 812. Referring to column 806, the header allowance, $S_H$, is an even number value since there are two track headers adjacent to each data field. Thus, header allowance $S_H$ ranges from 6 at zone 0 to four at zone 15. Thus, referring to FIG. 5, in zone 0, there are approximately three samples taken from target data fields 230 which are immediately adjacent to a neighboring track header, such as adjacent track header 212. However, when target data field 230 is located in zone 15, a total of two samples are taken of target data fields 230 which are immediately adjacent to a neighboring tractor.

Referring to column 808, the defect allowance, $S_M$, decreases gradually from a value of four samples at zone 0 to two samples at zone 15. This indicates that the maximum defect size decreases as the radial distance decreases. Referring to column 810, the sampling allowance, $S_S$, is a constant value of 2 since an interrupt occurs at the beginning of every data field 230 and a single interrupt occurs at the end of every data field 230, regardless of zone location.

Referring to column 812, the margin allowance, $S_X$ varies from a value of nine samples at zone 0 to a value of two samples at zone 15. This indicates that the number of samples which may be corrupted due to system errors is minimal at the outside diameter and maximal at the inside diameter. Finally, referring to column 814, the sample threshold with a 1024 byte sector in each of the zones is determined from the values in columns 804 through 812. As described above, $S_{Allow}$, is equal to the sum of each of the four factors given in columns 806–812 of FIG. 8. $S_{Allow}$ is then subtracted from $S_{Data}$ to obtain the sample threshold $S_{Thresh}$.

As discussed above with reference to FIG. 1, low-density media utilizing sectors and tracks to store data have a specific number of sectors on each track. Since the sector headers are aligned and the rotation of the disk is maintained at a constant speed, the sample threshold value for low-density media remains constant. This is indicated in columns 906 and 914 in FIG. 9.

However, as described above with reference to FIG. 2, high-density media utilizing zones to store data is subject to substantial header cross-talk due to the non-alignment of sector headers (such that data fields are next to sector headers). In addition, either the rotation speed or the clock period is allowed to vary from one zone to the next. Although high-density media utilizing the zoned storage approach allow tracks with larger radii to store more data than tracks with smaller radii, the sample threshold is dependent upon these characteristics and therefore varies from zone to zone. This is indicated in columns 910 and 918 of FIG. 9.

FIG. 9 is a lookup table which is used in the blank check detection system and method of the present invention. FIG. 9 provides $S_{Data}$ and $S_{Thresh}$ values for a number of combinations of zone, sector size, and low density media (as shown in FIG. 1) and high density or zoned media (as shown in FIG. 2). Specifically, column 902 is the zone number. Columns 904 and 906 provide $S_{Data}$ and $S_{Thresh}$ values for 1024 byte sectors in low density media, and columns 908 and 910 provide $S_{Data}$ and $S_{Thresh}$ values for 1024 byte sectors in high density media. Similarly, columns 912/914 and 916/918 provide $S_{Data}$ and $S_{Thresh}$ values for 512 byte sectors in low density and high density media, respectively. It is noted that the values shown in FIG. 9 were obtained using the procedure described above, such that a person skilled in the relevant art would find the generation of the values in FIG. 9 to be apparent. The particular example described above is shown in Table 9 at zone 0, columns 908 and 910.

C. Amplitude Threshold Determination

As discussed above, the amplitude of the read signal is compared in step 414 to an amplitude threshold value to determine if the sample bit position contains data or is blank. This amplitude threshold value is discussed in this section.

The amplitude threshold value is determined in the preferred embodiment based upon the evaluation of multiple samples of media from many vendors. Particularly, the inventors sampled ten pieces of optical disk media from three vendors. The sampling included the writing and reading of sectors in optical disk media containing data and no data. The results of this evaluation is provided in FIG. 10. Referring to FIG. 10, the number of samples of the read peak signal amplitude are represented on the Y-coordinate and the read peak signal amplitude as a percentage of maximum voltage (or amplitude) is provided on the X-coordinate. As shown in FIG. 10, when reading blank data fields the majority of samples centered around 15% of maximum signal amplitude. This is shown as curve 1002 in FIG. 10.

When reading written data from the sampled optical disk media, the maximum number of samples centered around 75% of maximum signal amplitude. This is shown as curve 1004 in FIG. 10.

In determining the amplitude threshold used in step 414, the inventors selected the amplitude threshold so as not to overlap with the tail of either distribution 1002, 1004 as shown in FIG. 10. In addition, it is more desirable to report a blank sector as non-blank than to report a written sector as blank. This criterion results in a blank sector not being used rather than overwriting a written sector.

Given the above criterion, the inventors chose an amplitude threshold 1006 of 40% of maximum signal amplitude. In the preferred embodiment of the present invention, the read peak signal amplitude is 5 volts. Thus, the amplitude threshold is equal to 40% of five volts or 2 volts. However, as a person skilled in the relevant art would find apparent, any threshold may be chosen given the desired criterion for the amplitude threshold.

D. Calibrations

Since the read peak signal is being compared against a fixed amplitude threshold, it is necessary to calibrate the read channel gain such that the read peak signal is consistent for the written/blank sectors. The signal amplitude varies based on the media, head, read channel and ambient temperature. Thus, the calibration of the gain of read/write channel 340 consists of the following steps.

First, controller 322 writes data on a reserved area of optical disk 306 which is allocated to be used exclusively for calibrations. In the preferred embodiment, approximately 16 sectors of data are written to this reserved area. Then, the writing of the data is verified by reading the data back.

Second, controller 322 issues a command to digital signal processor 335 to perform a gain adjustment over the above written data. Digital signal processor 335 can control the read channel gain and adjusts it such that the read peak signal is calibrated to a predetermined value, which is implementation dependent and which is preferably 5 volts (discussed above with reference to FIG. 10).

Optical disk drive 300 operates as normal once the calibration operation is complete. This process is repeated periodically to allow for ambient temperature variations. The above process is also repeated each time a new optical disk 306 is loaded into optical disk drive 300. In the preferred embodiment of the present invention, the above calibrations are repeated approximately every 5 minutes. However, as one skilled in the relevant art would find apparent, any time duration may be programmed in digital signal processor 335 to accommodate the environmental conditions in which the optical disk drive 300 is operating.

Although the invention has been described and illustrated with a certain degree of particularity, it is understood that those of ordinary skill in the relevant art will recognize a variety of additional applications and appropriate modifications within the spirit of the invention and the scope of the claims.

What is claimed is:

1. A method, for use with an optical disk having a plurality of sectors, each sector having a plurality of data fields, each sector having further location information for locating a target sector and a target data field, for detecting blank sectors, comprising the steps of:

(1) retrieving the location information;

(2) utilizing the location information to locate the target sector;

(3) generating a read back signal having an amplitude by sampling a plurality of data positions in a target data field;

(4) generating a read peak signal based upon said sampling of said data positions, said read peak signal having an amplitude;

(5) comparing said read peak signal amplitude to a predetermined amplitude threshold;

(6) incrementing a counter when said read peak signal amplitude is less than said amplitude threshold, said counter indicating a number of said sampled data positions of said target data field containing no data; and (7) after performing steps (3)–(6) for said target data field, comparing said counter to a sample threshold representing a minimum number of data positions containing no data for said sector to be considered blank, wherein said sample threshold is determined based upon media characteristics of the optical disk and adverse factors which may potentially cause read peak signal corruption, and wherein said step of comparing comprises the steps of:

(a) determining said sector is blank if said counter is greater than said sample threshold; and (b) determining said sector is not blank if said counter is less than said sample threshold.

2. The method of claim 1, further comprising the steps of:

(8) before step (1), setting a readback signal gain for amplifying said readback signal, said readback signal gain calibrated according to characteristics of said optical disk and optical disk drive, and external environmental conditions;

(9) receiving an interrupt representing the beginning of a data field within said target sector; and

(10) utilizing said interrupt to trigger step (1).

3. The method of claim 2, wherein said read peak signal is an average amplitude of said readback signal.

4. The method of claim 1, wherein steps (3)–(6) are periodically performed every 20 microseconds until said target data field is completely sampled.

5. The method of claim 1, wherein said media characteristics of said optical disk include capacity and sector size.

6. The method of claim 1, wherein said adverse factors include header crosstalk.

7. The method of claim 1, wherein said adverse factors include media defects.

8. The method of claim 1, wherein said adverse factors include sampling errors.

9. The method of claim 1, wherein said adverse factors include system conditions.

10. The method of claim 1, wherein said read peak signal is proportional to the amplitude of said readback signal.

11. An optical disk drive for detecting blank sectors in an optical disk having a plurality of sectors, each sector having a plurality of data fields, each sector having further location information for locating a target sector and a target data field, comprising:

detector means for generating readback signals in response to optical signals reflected from sampled data positions of a sector on the optical disk;

read channel circuitry, coupled to said detector means, for generating read peak signals that are proportional to said readback signals;

signal processing circuitry, responsive to said read peak signals, for comparing a number of said sampled data positions in said sector for which said read peak signals have an amplitude exceeding an amplitude threshold value to a sample threshold value based upon media characteristics of the optical disk and adverse factors which may potentially corrupt said read peak signal; and a digital signal processor, coupled to said read channel circuitry, for setting a read channel gain for amplifying said readback signals received from said detector means, for initializing a blank sector detection process, and for processing the sector location information.

12. The optical disk drive of claim 11, wherein said media characteristics of said optical disk include capacity and sector size.

13. The optical disk drive of claim 11, wherein said adverse factors include header crosstalk.

14. The optical disk drive of claim 13, wherein said adverse factors further include media defects, sampling errors, and system conditions.

15. The optical disk drive of claim 11, wherein said digital signal processor is capable of locating said target sector.

16. An optical disk drive for detecting blank sectors in an optical disk media, comprising:

a laser source for generating a laser beam at a discrete power level for reading binary data from an optical disk;

a digital signal processor coupled to said laser source;

laser beam guidance means for directing said laser beam from the laser source through an objective lens toward a location on the reflective surface of the optical disk, said location being determined by said digital signal processor;

an optical detector positioned to detect reflected laser light from the reflective surface and for generating readback signals in response to optical signals reflected from sampled data positions of a sector on the optical disk;

read channel means, coupled to the optical detector for amplifying said readback signals generated by the optical detector and for generating read peak signals based on an average amplitude of said read back signals; and signal processing circuitry, responsive to said read peak signals, for comparing a number of said sampled data positions in said sector for which said read peak signals have an amplitude exceeding an amplitude threshold value to a sample threshold value based upon media characteristics of the optical disk and adverse factors which may potentially cause said read peak signals to be corrupt.

* * * * *